(12) United States Patent
Arimura et al.

(10) Patent No.: US 8,404,138 B2
(45) Date of Patent: Mar. 26, 2013

(54) STRIPPING AGENT FOR SECONDARY BATTERY ELECTRODE MATERIAL AND METHOD OF TREATING SECONDARY BATTERY USING THE STRIPPING AGENT

(75) Inventors: Kazutaka Arimura, Toyota (JP); Hiroshi Yamasaki, Hamamatsu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 752 days.

(21) Appl. No.: 12/527,749

(22) PCT Filed: Feb. 19, 2008

(86) PCT No.: PCT/IB2008/000377
§ 371 (c)(1),
(2), (4) Date: Aug. 19, 2009

(87) PCT Pub. No.: WO2008/102240
PCT Pub. Date: Aug. 28, 2008

(65) Prior Publication Data
US 2010/0012149 A1    Jan. 21, 2010

(30) Foreign Application Priority Data
Feb. 20, 2007    (JP) .................................. 2007-038769

(51) Int. Cl.
*C03C 15/00* (2006.01)
(52) U.S. Cl. ........................ 216/83; 423/179.5; 429/49
(58) Field of Classification Search ........ 134/3; 203/14; 204/554; 205/598, 601; 359/265; 423/179.5, 423/62, 66; 429/105, 316, 49; 502/101; 524/595; 526/328.5; 75/419
See application file for complete search history.

(56) References Cited

U.S. PATENT DOCUMENTS

| | | | | |
|---|---|---|---|---|
| 3,772,104 | A * | 11/1973 | Chandross et al. | ............. 216/92 |
| 4,587,291 | A |  5/1986 | Gardziella et al. | |
| 4,650,553 | A |  3/1987 | Felgendreger et al. | |
| 5,520,794 | A |  5/1996 | Gernon | |
| 6,824,920 | B1 * | 11/2004 | Iwamoto et al. | ........... 429/218.1 |
| 7,060,391 | B2 |  6/2006 | Gyenge et al. | |
| 2004/0028585 | A1* |  2/2004 | Cardarelli et al. | ............. 423/66 |
| 2008/0050295 | A1* |  2/2008 | Uchida et al. | ............. 423/179.5 |

FOREIGN PATENT DOCUMENTS

| | | |
|---|---|---|
| AU | 477467 | 10/1974 |
| GB | 1 404 846 | 9/1975 |
| JP | 9-195071 | 7/1997 |
| JP | 10-255861 | 9/1998 |

(Continued)

OTHER PUBLICATIONS

"Notification of Reason(s) for Refusal" in Japanese Patent Application No. 2007-038769, filed Feb. 20, 2007 (Drafting date: Jul. 14, 2009).

*Primary Examiner* — Duy Deo
*Assistant Examiner* — Erin Bergner
(74) *Attorney, Agent, or Firm* — Finnegan, Henderson, Farabow, Garrett & Dunner, LLP

(57) ABSTRACT

An electrode of a secondary battery is treated to remove an electrode material adhering to the current collector of the electrode. The electrode is treated by exposing to a stripping agent, which is constituted as an aqueous solution containing at least one of an organic sulfonic acid and derivative thereof, and the electrode exposure to each other to strip the electrode material from the current collector constituting the electrode.

11 Claims, 5 Drawing Sheets

FOREIGN PATENT DOCUMENTS

| | | |
|---|---|---|
| JP | 10-255862 | 9/1998 |
| JP | 2007-179774 | 7/2007 |
| WO | WO 00/19557 | 4/2000 |
| WO | WO 00/20395 | 4/2000 |
| WO | WO 2005/124921 | * 12/2005 |

* cited by examiner

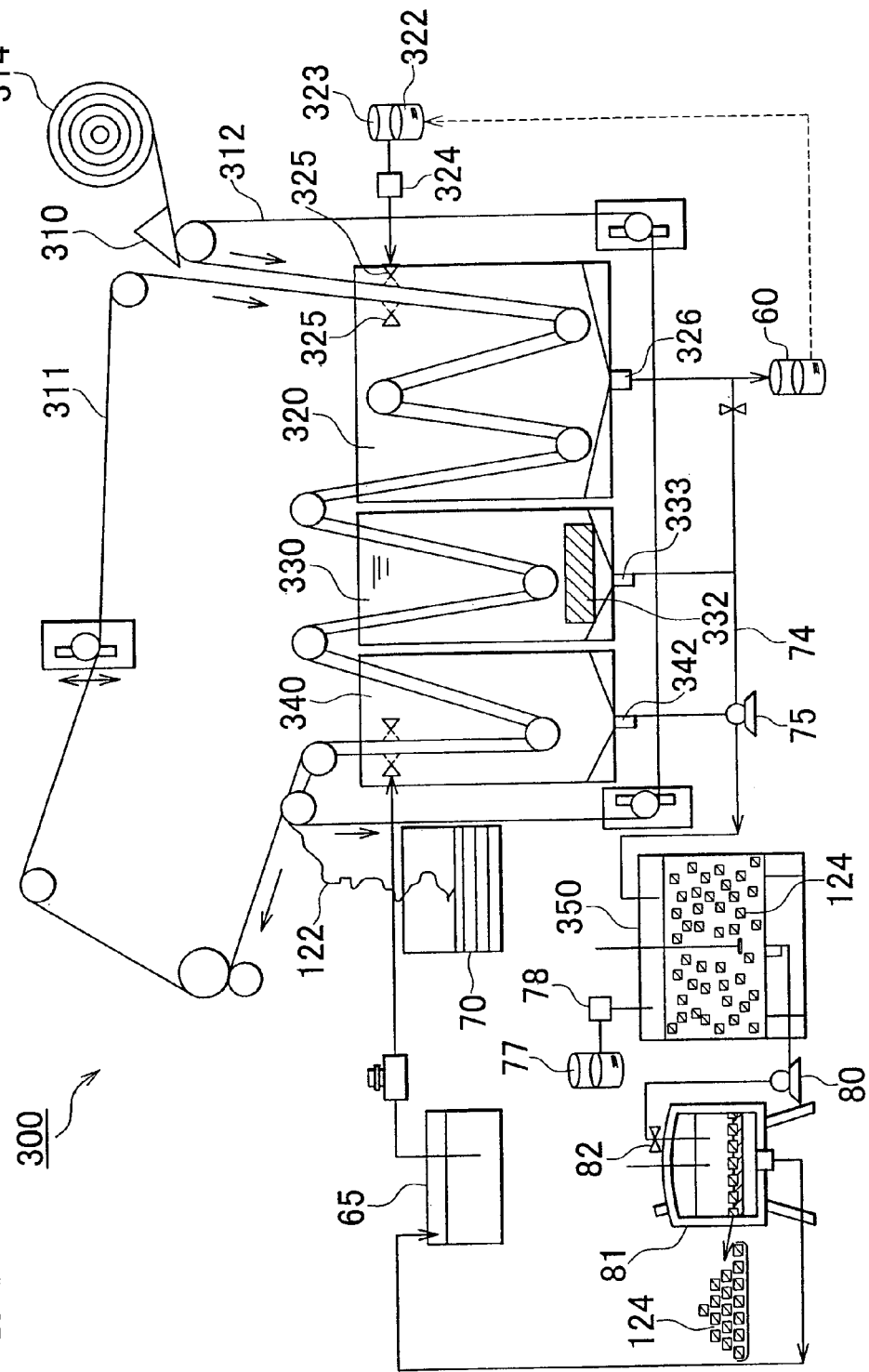

FIG. 5

| | NAME OF ORGANIC SULFONIC ACID | CHEMICAL FORMULA | WATER SOLUBILITY | DERIVATIVE |
|---|---|---|---|---|
| ALIPHATIC SULFONIC ACID | METHANESULFONIC ACID | $CH_3SO_3H$ | YES | AMMONIUM SALT, METHYL ESTER, AND THE LIKE |
| | ETHANESULFONIC ACID | $CH_3CH_2SO_3H$ | YES | ETHYL ESTER AND THE LIKE |
| | METHANEDISULFONIC ACID | $HO_3SCH_2SO_3H$ | YES | DIMETHYL ESTER |
| | ETHYLMETHYLSULFONIC ACID | $CH_3SO_2C_2H_5$ | YES | |
| AROMATIC SULFONIC ACID | BENZENESULFONIC ACID | C$_6$H$_5$–SO$_3$H | YES | SODIUM SALT, METHYL ESTER, AND THE LIKE |
| | TOLUENESULFONIC ACID | CH$_3$–C$_6$H$_4$–SO$_3$H | YES | SODIUM SALT, ANILINE SALT |
| | XYLENESULFONIC ACID | (CH$_3$)$_2$C$_6$H$_3$–SO$_3$H | YES | CHLORIDE |
| | NAPHTHALENESULFONIC ACID | C$_{10}$H$_7$–SO$_3$H | YES | METHYL ESTER |

F I G . 6

| | NAME OF ORGANIC SULFONIC ACID | CONCENTRATION OF AQUEOUS SOLUTION | CONTACT TIME | Al FOIL REDUCTION RATE | Cu FOIL REDUCTION RATE |
|---|---|---|---|---|---|
| ALIPHATIC SULFONIC ACID | METHANESULFONIC ACID | 10% | 60 SECONDS | 0.35% | <0.05% |
| | ETHANESULFONIC ACID | 10% | 60 SECONDS | 0.32% | <0.05% |
| | METHANEDISULFONIC ACID | 10% | 60 SECONDS | 0.48% | <0.05% |
| | ETHYLMETHYLSULFONIC ACID | 10% | 60 SECONDS | 0.22% | <0.05% |
| AROMATIC SULFONIC ACID | BENZENESULFONIC ACID | 10% | 60 SECONDS | 0.12% | <0.05% |
| | TOLUENESULFONIC ACID | 10% | 60 SECONDS | 0.11% | <0.05% |
| | XYLENESULFONIC ACID | 10% | 60 SECONDS | 0.12% | <0.05% |
| | NAPHTHALENESULFONIC ACID | 10% | 60 SECONDS | 0.11% | <0.05% |

STRIPPING AGENT FOR SECONDARY BATTERY ELECTRODE MATERIAL AND METHOD OF TREATING SECONDARY BATTERY USING THE STRIPPING AGENT

CROSS-REFERENCE TO RELATED APPLICATIONS

This application is a national phase application of International Application No. PCT/IB2008/000377, filed Feb. 19, 2008, and claims the priority of Japanese Application No. 2007-038769, filed Feb. 20, 2007, the contents of both of which are incorporated herein by reference.

BACKGROUND OF THE INVENTION

1. Field of the Invention

The invention relates to a technique for recovering valuable resources from a secondary battery. In particular, the invention relates to a technique for stripping and recovering an active material or constituents thereof from an electrode of a secondary battery (e.g., a lithium secondary battery).

2. Description of the Related Art

Many valuable metals that are precious as resources are used as active materials of a secondary battery, and emphasis has been given to the recovery of the metals from used batteries and the reutilization of the metals. For example, lithium cobalt oxide has recently been in heavy usage as a positive active material for lithium-ion secondary batteries, and there are demands for a technique for recovering a positive active material containing high-value cobalt with high purity. As a prerequisite for recovering this active material with high purity, it is necessary to reliably separate the active material from the current collector of an electrode. However, an electrode for lithium-ion secondary batteries has a structure in which the active material is securely attached to the surface of a current collector and applied thereto as a thin film to improve durability against the multiple charge/discharge cycles and to prevent the electrode from being stripped even when in contact with an organic solvent of an electrolytic solution. For this reason, the current collector and the active material are not easily separated from each other through a physical operation.

In view of the difficulty in separating the active material from the current collector a stripping agent is generally used. In particular, a method uses various stripping agents are used on a waste electrode that includes an active material and the active material is thereby stripped from the waste electrode and recovered. A method of stripping and recovering an active material from a waste electrode in this manner is described in each of the following documents of the related art. For example, Japanese Patent Application Publication No. 9-195071 (JP-A-9-195071) describes a method in which a metal foil-applied waste material of a secondary battery is exposed to a stripping agent made of an organic solution mainly constituted of alkyl phosphoric acid or dialkyl phosphoric acid to strip a metal foil (current collector) of the metal foil-applied waste material and an electrode material containing an active material (lithium cobalt oxide or the like) from each other. According to this stripping method, the active material in the metal foil-applied waste material and the metal foil are stripped directly from each other, and hence can be separated easily from each other and recovered. Japanese Patent Application Publication No. 10-255862 (JP-A-10-255862) describes cases where an acid solution (hydrofluoric acid, sulfuric acid), an alkali metal hydroxide solution (sodium hydroxide), and the like are used as stripping agents instead of an organic solvent. This publication describes that the use of these stripping agents makes it possible to separate an active material and a metal foil (aluminum foil) from each other without using an organic solvent, which is onerous to handle.

However, when an organic solution of alkyl phosphoric acid as described in Japanese Patent Application Publication No. 9-195071 (JP-A-9-195071) is used as a stripping agent, it takes a relatively long treatment time (10 to 180 minutes) to separate an active material and a metal foil from each other. Therefore, high efficiency is not expected. In addition, a water-insoluble organic solvent medium is used as a solvent for dissolving alkyl phosphoric acid. Therefore, from the standpoint of environment conservation, the organic solvent medium needs to be recovered after a stripping treatment. Furthermore, attention needs to be paid to the flammability of the organic solvent medium as well. Thus, the operation of stripping is bothersome, and also, the cost of recovery may be comparatively high. On the other hand, according to a method in which an active material and a metal foil current collector (aluminum foil) are separated from each other through immersion in an acid solution such as sulfuric acid or the like, part of the aluminum foil dissolves. Therefore, the amount of impurities mixed in with the stripped and recovered active material increases, and moreover, metal constituents turned into a solution also need to be recovered separately. Further, when an active material and an aluminum foil are separated from each other through immersion in an alkali metal hydroxide solution, the aluminum foil, which is an amphoteric substance, corrodes to generate a large amount of aluminum hydroxides. Therefore, there arises an additional need to perform a treatment of separating aluminum. When impurities get mixed in with an active material stripped and recovered as described above, a refinement treatment process and a post-treatment, which are troublesome and time-consuming, need to be performed. Thus, a rise in cost is caused, and therefore, there may arise circumstances that make it difficult to reutilize the active material for batteries.

Document D5 (U.S. Pat. No. 4,650,553) discloses that lead is recovered from lead-containing scrap metal in an electrolytic process employing an aqueous solution of $C_{1-4}$ alkanesulfonic acid as the electrolyte at high concentration, scrap lead as the anode, and an electro-conductive cathode, impressing an electromotive force across the solution between the electrodes to provide a specified steady-state concentration of lead salt in the electrolyte, and continuing the process to deplete the anode and collect lead at the cathode.

Document D6 (U.S. Pat. No. 5,520,794) discloses an electrowinning process for lead incorporating a variety of alkanesulfonic acid-based electrolytes in the absence of a redox couple; an inert anode and a lead acceptable cathode are utilized.

In each of the above described methods, there is still room for improvement in reducing the time required for stripping and recovering, the purity of the stripped and recovered active material, the cost of recovery, and the like.

SUMMARY OF THE INVENTION

The invention to provides a stripping agent that efficiently strips an active material adhering to a current collector of an electrode provided in a secondary battery (more specifically, an electrode material containing an active material adhering to an electrode current collector made of a metal foil or the like). The invention also provides a stripping agent that strips an active material or constituents of the active material in a form that facilitates reutilization of the active material. The invention further provides a treatment method and a treatment device that strips and recovers an active material or constituents of the active material from a current collector of a secondary battery such as a lithium secondary battery using such a stripping agent.

A first aspect of the invention relates to a stripping agent used to strip an electrode material from the current collector of an electrode of a secondary battery such as a lithium secondary battery or the like. The stripping agent may be an aqueous solution that contains at least one of an organic sulfonic acid and an organic sulfonic acid derivative. It should be noted herein that the term "secondary battery" refers to a rechargeable storage device in general. This term encompasses so-called storage batteries such as lithium secondary batteries (including lithium-ion secondary batteries and metal lithium secondary batteries), nickel metal hydride batteries, nickel-cadmium batteries, and the like, and storage elements such as electric double layer capacitors and the like.

The stripping agent according to the invention is mainly constituted at least one of an organic sulfonic acid and an organic sulfonic acid derivative. In consequence, by exposing an electrode of a secondary battery to the stripping agent, the electrode material can be dropped off easily from the current collector. That is, the electrode material containing the active material can be separated from the current collector in a relatively short time. Thus, the recovery of an active material and the like from a waste battery may be carried out efficiently. For example, while a stripping treatment time of 10 to 180 minutes is required in the case of an organic solution of alkyl phosphoric acid, a substantial reduction in the stripping treatment time (typically by several minutes, for example about 60 seconds) may be achieved by using the stripping agent according to the invention. Further, according to the stripping agent of the invention, the elution of metal constituents constituting the current collector can be suppressed. Thus, a refinement treatment is easy to perform, and valuable resources such as an active material and the like can be recovered from a stripped and recovered object in a form making reutilization (recycling) easier. In other words, the efficiency of recycling the valuable resources can be enhanced.

Water may be used as an aqueous solvent constituting the stripping agent. By using water as the solvent, the necessity of an environment measure which would be necessary in the case of using an organic solvent (e.g., an operation of recovering the organic solvent that has been used for a stripping treatment) is eliminated. As a result, the stripping treatment can be performed more efficiently.

The concentration of the at least one of an organic sulfonic acid and the derivatives thereof in the stripping agent according to the invention may be 5 to 50 mass %. By using a stripping agent in this concentration range, an electrode material for a cathode of a secondary battery, especially a lithium secondary battery may be stripped efficiently from a cathode current collector. A stripping agent with a concentration of 10 to 30 mass % is especially preferred.

The organic sulfonic acid may be an aromatic sulfonic acid. In particular, at least one substance selected from benzenesulfonic acid, toluenesulfonic acid, xylenesulfonic acid, and naphthalenesulfonic acid is preferred. By using this kind of organic sulfonic acid and/or derivative thereof, the elution of a metal constituent (e.g., an aluminum constituent) constituting the current collector can be suppressed significantly. Accordingly, a target active material (e.g., an oxide of cobalt or the like) or constituents thereof (e.g., high-value metal constituents such as cobalt and the like) can be recovered with high purity.

A second aspect of the invention provides a method of treating a secondary battery (e.g., a lithium secondary battery) using the stripping agent according to the foregoing first aspect of the invention. That is, the second aspect of the invention relates to a method of treating a secondary battery equipped with an electrode composed of a current collector and an electrode material adhering thereto. The method includes a process of exposing the electrode to a stripping agent made of an aqueous solution containing at least one of an organic sulfonic acid and derivative thereof to strip the electrode material from the current collector.

In the method of treating the secondary battery, the electrode material (i.e., an active material layer formed on the current collector) may be easily stripped from the current collector of the electrode by using the aqueous solution containing at least one of an organic sulfonic acid and derivatives thereof as the stripping agent. Any one of the foregoing preferred stripping agents may be used as the stripping agent.

The described process of stripping may further include a treatment of spraying the stripping agent on the electrode. By adopting a spraying method, the electrode can be constantly supplied with the stripping agent in a fresh state. Thus, a high stripping effect may be maintained stably.

The process of stripping may also include a treatment of applying physical vibrational energy to the electrode. For example, ultrasonic vibration may be used to vibrate the electrode. By performing this treatment, the electrode whose binding capacity has weakened due to the effect of the stripping agent can be removed reliably in a short time.

In the process of stripping, the electrode and the aqueous solution (stripping agent) may be exposed to each other at room temperature (typically 0° C. to 30° C.). By performing the treatment of stripping in a room temperature range, the elution of constituents originating from the current collector may be reduced.

The method of treating the secondary battery according to the invention may further include a recovery process of recovering a target substance, typically an active material or constituents thereof, or the current collector from the stripped electrode material. This recovery process may include a treatment of supplying a flocculant to a recovered liquid containing the electrode material stripped from the current collector to flocculate the electrode material (stripped object). By performing this flocculation treatment, the constituents of the electrode material stripped using the stripping agent (the aqueous solution) can be made to assume typically the state of a floc (conglomerate). Therefore, target valuable resources (typically an active material containing a high-value metal element such as cobalt or the like or constituents thereof) may be separated and recovered easily through filtration or the like.

The stripping agent according to the invention and the method of treating the secondary battery according to the invention may be adopted to strip and recover a positive active material of, especially, a lithium secondary battery. Accordingly, the invention may be applied to a lithium secondary battery including a positive active material substantially constituted of a metal complex oxide (e.g., lithium cobalt oxide) whose constituent elements are lithium and one or two or more transition metals (e.g., cobalt).

A third aspect of the invention provides a device for treating a secondary battery (e.g., a lithium secondary battery) using the stripping agent. That is, the third aspect of the invention relates to a device for treating a secondary battery equipped with an electrode composed of a current collector and an electrode material adhering thereto. The device is equipped with electrode holding means for holding the electrode, supply means for supplying the held electrode with a stripping agent made of an aqueous solution containing at least one of an organic sulfonic acid and derivative thereof, and vibration means for vibrating after the stripping agent is supplied to the electrode. The supply means may spray the stripping agent on the electrode. According to the electrode material stripping device thus constructed, the method of treating the secondary battery according to the invention as described above may be appropriately implemented.

The vibration means may include an ultrasonic oscillator. For example, the vibration means vibrates the electrode after the electrode has been immersed in a water bath having the ultrasonic oscillator. The method of treating the secondary battery according to the invention is appropriately implemented by the device constructed as described above.

The treatment device may be constructed such that the secondary battery to be treated is equipped with a long sheet-shaped electrode, and that the electrode holding means and the supply means continuously supplies the sheet-shaped electrode with the stripping agent while moving the electrode. According to this construction, an active material (e.g., a positive active material of a lithium secondary battery) as valuable resources can be stripped/recovered efficiently and continuously from a spent secondary battery equipped with, for example, a rolled-up electrode.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is a schematic view of a device for stripping and recovering the electrode material from the secondary battery according to one example of the invention;

FIG. 5 shows the names of representative substances usable as a stripping agent mainly constituted of an organic sulfonic acid, the chemical formulae thereof, the solubility of the substances in water, and the names of representative derivatives thereof; and FIG. 6 shows a result of measurement of reduction weight rates of a recovered cathode current collector (aluminum foil) and an anode current collector (copper foil).

DETAILED DESCRIPTION OF EMBODIMENT

Figure 1:
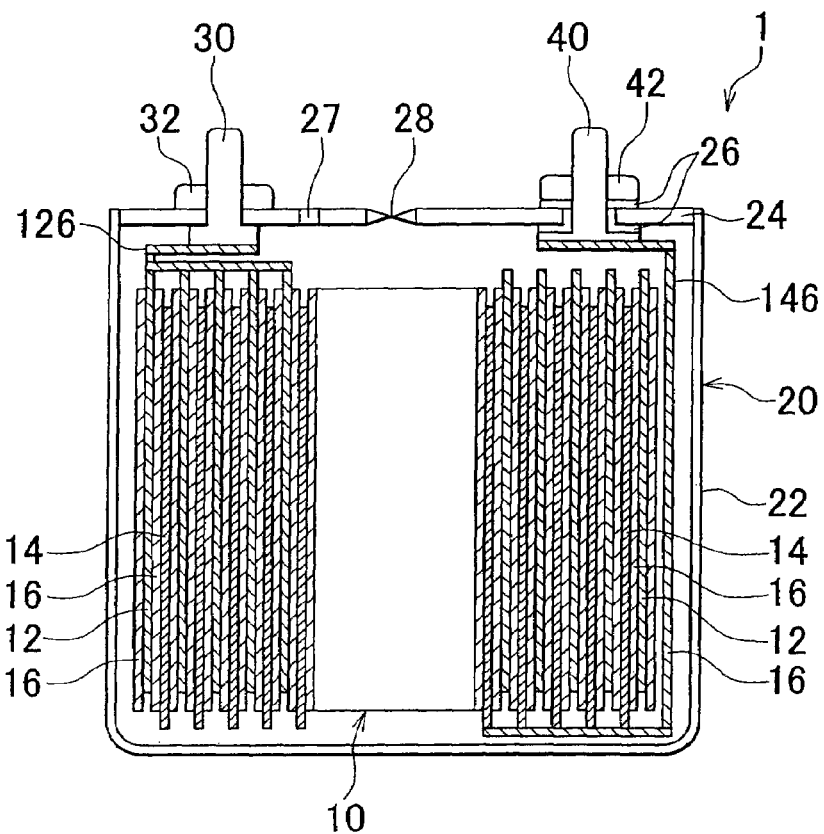
FIG. 1 is a sectional view schematically showing the construction of a lithium-ion secondary battery according to one example of the invention.

According to one embodiment of the invention, the stripping agent may be an aqueous solution containing at least one of an organic sulfonic acid and derivative thereof. The types of the contained organic sulfonic acid (i.e., an organic compound having a carbon skeleton and a sulfo group (sulfonic acid group)) or the derivative thereof are not limited in particular. Aliphatic sulfonic acids such as methanesulfonic acid, ethanesulfonic acid, methanedisulfonic acid, ethylmethylsulfonic acid, are typical examples of the organic sulfonic acid. Aromatic sulfonic acids such as benzenesulfonic acid, toluenesulfonic acid, xylenesulfonic acid, naphthalenesulfonic acid, are preferred organic sulfonic acids. In addition to the enumerated sulfonic acids, for example, organic amino sulfonic acids such as phenolsulfonic acid, anisolesulfonic acid, (o-, m- or p-)cresolsulfonic acid, catecholsulfonic acid, 2-morpholinoethanesulfonic acid, are also suitable as organic sulfonic acids. An organic sulfonic acid derivative also includes various salts. For example, ammonium salts of aliphatic sulfonic acids or aromatic sulfonic acids (e.g., benzenesulfonic acid ammonium), sodium salts thereof (e.g., benzenesulfonic acid sodium), methyl ester, and the like can be mentioned. The stripping agent may contain one or more of the stated organic sulfonic acids and derivatives thereof (which will be comprehensively referred to hereinafter as "organic sulfonic acid compounds"). The stripping agent may contain various constituents in addition to the organic sulfonic acid compound as a main constituent as long as the original stripping performance thereof is not lost significantly. For example, dyes, pH adjustors, viscosity modifiers (thickeners or the like), perfumes, surfactants, and the like can be mentioned.

The stripping agent is typically prepared by dissolving one or more organic sulfonic acid compounds in an appropriate aqueous solvent. Water or an organic solvent that is compatible with water may be used as the aqueous solvent. A lower alcohol such as methanol, ethanol, or the like can be mentioned as the organic solvent having compatibility with water. Water is especially preferred as the aqueous solvent. By using water, a solvent recovery treatment performed in the case of using an organic solvent can be omitted.

The stripping agent may be prepared so that the concentration of the organic sulfonic acid compound (the concentration of a total of two or more organic sulfonic compounds when these compounds are mixed with one another) is 5 to 50 mass %. This is because an excessively high concentration of the organic sulfonic acid compound increases the organic sulfonic acid which does not contribute a stripping effect and leads to wastefulness whereas an insufficient concentration of the organic sulfonic acid compound decreases the efficiency of stripping the electrode material. Ideally, the concentration of the organic sulfonic acid compound in the stripping agent is about 10 to 30 mass %.

In the embodiment of the invention, the construction of a secondary battery to be treated is not limited in particular. A lithium secondary battery, a nickel metal hydride battery, an electric double layer capacitor, or the like may be used as the secondary battery to be treated. The lithium secondary battery is especially preferred. It is appropriate that an electrode as a treated object from which an electrode material is to be stripped has a current collector and the electrode material (active material layer) adhering to the surface thereof. A cathode having a positive active material layer made of a cathode electrode material on a cathode current collector made of a metal foil such as an aluminum foil or the like (e.g., a cathode for lithium-ion batteries) is preferred as the electrode of the secondary battery to be treated. However, the electrode of the secondary battery to be treated may be an anode having an anode active material layer made of an anode electrode material on an anode current collector made of a metal foil such as a copper foil or the like (e.g., an anode for lithium-ion batteries). That is, the stripping agent can be used regardless of whether the electrode is a cathode or an anode. The stripping agent is in the form of an aqueous solution and hence can be used without being limited to the form of a secondary battery. For example, a rolled-up electrode obtained by rolling up a cathode current collector and an anode current collector, each assuming the shape of a long sheet with an active material layer formed on a surface thereof, together with separators (see a later-described example) may be treated with ease.

More specifically, when the electrode to be treated is a cathode, a metal foil made of, for example, aluminum (which means that the metal foil is mainly constituted of aluminum or an alloy mainly made of aluminum, and the same will hold true hereinafter) may be used as the cathode current collector. The stripping agent according to this embodiment of the invention may be suitably used for a cathode having a cathode electrode material on a cathode current collector made of aluminum as described above. A substance containing various positive active materials used as materials of a cathode of a typical secondary battery may serve as the cathode electrode material to be stripped. For example, a composite oxide containing lithium and one or two or more transition metals as constituent metal elements thereof may be used as a typical example of a positive active material for lithium secondary batteries. A composite oxide containing lithium and cobalt (which may also contain at least one metal element other than lithium and cobalt), a composite oxide containing lithium and nickel (which may also contain at least one metal element other than lithium and nickel), a composite oxide containing lithium and manganese (which may also contain at least one metal element other than lithium and manganese), and the like are preferred examples of the composite oxide. The cathode electrode material may contain various binding materials (polyvinylidene fluoride, polytetrafluoroethylene, polyethylene oxide, and the like) and a conductive material (e.g., carbon black) in addition to the positive active material. The stripping agent according to this embodiment of the invention may be used on a cathode that includes a cathode electrode material containing those binding materials (binders) and the conductive material. Alternatively, a cathode electrode material (active material layer) from which the binding materials have been removed in advance through a heat treatment or the like may be treated.

On the other hand, when the electrode to be treated is an anode, a metal foil made of, for example, copper (which means that the metal foil is mainly constituted of copper or an alloy mainly made of copper, and the same will hold true hereinafter) may be used as the anode current collector. The stripping agent according to this embodiment of the invention may be suitably used for an anode having an anode electrode material on an anode current collector made of copper as described above. A substance containing various anode active materials used as materials constituting an anode of a secondary battery can be mentioned as the anode electrode material to be stripped. For example, a graphitized carbon material and the like may be used as typical examples of an anode active material of a lithium-ion secondary battery. The anode electrode material may contain various binding materials (carboxymethyl cellulose and the like) in addition to the anode active material. The stripping agent according to this embodiment of the invention may be used for an anode including an anode electrode material containing those binding materials and the like.

A method of treating a secondary battery according to the embodiment of the invention can be put into practice by using the stripping agent. A desired stripping agent is supplied to an electrode of a secondary battery as a treated object, and thereby exposed to a current collector and an electrode material of the electrode. The stripping agent is supplied typically to the extent of damping the electrode material (active material layer) that has adhered to the current collector through various methods. For example, in the case of a cathode current collector such as an aluminum foil or the like, it is preferable to supply about 1.0 to 2.0 g of the stripping agent per 100 $cm^2$ of the cathode current collector through spraying or the like. In the case of an anode current collector such as a copper foil or the like, it is preferable to supply about 0.8 to 1.6 g of the stripping agent per 100 $cm^2$ of the anode current collector through spraying or the like. Instead of spraying, for example, the electrode may be immersed for a treatment in a large amount of the stripping agent. Also, a desired amount of the stripping agent may be applied to the surface of the electrode (current collector) through a dipping treatment or the like.

It is appropriate that the stripping agent is supplied to the electrode so that the electrode and the stripping agent are exposed to each other at a room temperature (typically 0° C. to 30° C., preferably 10° C. to 30° C.). Accordingly, the elution of constituents from the current collector is sufficiently suppressed while maintaining a short stripping treatment time, and the efficiency of stripping in a stripping process and the suppression of the elution of a metal material constituent constituting the current collector (e.g., an aluminum material) may be optimized. On the other hand, if the electrode and the stripping agent are exposed to each other in a higher temperature range (e.g., a temperature range of 40° C. to 60° C.), although the stripping time is reduced, the proportion of the constituents of the current collector that is eluted increases; therefore, the processes of fractionation/refinement become cumbersome.

According to the treatment method using the described stripping agent, the current collector and the electrode material may be separated from each other through a treatment for a relatively short time. For example, a relatively long time (e.g., 10 to 180 minutes) is required for a stripping treatment in the case where a conventional typical stripping agent (e.g., an organic solution of alkyl phosphoric acid) is used. Meanwhile, when the stripping agent according to the invention which is mainly constituted of the organic sulfonic acid compound is used, the electrode material can be stripped from the current collector through a treatment (exposure) lasting for a rather short time (e.g., 60 seconds). Thus, a continuous treatment of the electrode can be realized in a predetermined device (see later-described examples).

The invention may be implemented with ease on the basis of the information disclosed herein (the composition of the stripping agent, the construction of the treatment device, and the like). Accordingly, the operation and mechanism of the stripping agent according to the invention which relate to the stripping of the electrode material (active material) are not required in grasping or implementing the invention. In exposing the stripping agent according to the invention to an electrode composed of a current collector and an electrode material adhering to the surface of the current collector through a method of spraying, immersion, dipping, or the like, the electrode material may partially or entirely removed from the current collector. This effect may be based on the fact that the binding capacity of the electrode material on a boundary face of the current collector may decrease. One example will now be described. For example, if the cathode current collector is an aluminum foil, a thin oxide layer ($Al_2O_3$) is produced on the surface of the aluminum foil through a reaction with oxygen in the atmosphere. When the current collector is exposed to the stripping agent under this state, a free sulfo group ($SO_4H^-$) in the stripping agent and the oxide layer ($Al_2O_3$) react with each other, so that an organic thin film of aluminum sulfate ($Al_2(SO_4)_3$) is produced on the surface of the aluminum foil. Then, the surface of the aluminum foil and the electrode material can be separated from each other via the organic thin film made of aluminum sulfate. It is thus considered that the binding capacity of the electrode material on the boundary face of the aluminum foil can be reduced and hence allows the electrode material to float up (be stripped).

Accordingly, as is also apparent from the foregoing operation and mechanism, the stripping treatment can be completed through short-time exposure of the electrode and the stripping agent by using the stripping agent according to this embodiment of the invention. In addition, the stripping agent according to the invention makes it possible to achieve a sufficient stripping effect through exposure of a small amount of the stripping agent with the electrode. Due to a reduction in the amount of consumption of the stripping agent, a drainage treatment is facilitated, and there is also a merit in terms of cost. Further, as described above, the amount of metal material constituent (e.g., the aluminum material) constituting the current collector that becomes mixed with the electrode material is reduced by using the stripping agent according to this embodiment of the invention. This is because the organic sulfonic acid is much less effective in dissolving the metal material used as the current collector of the secondary battery than other strong acids (e.g., hydrochloric acid and the like). More specifically, in the case where the current collector is an aluminum foil, a recovery rate of the recovered aluminum as an aluminum foil may be 99.5 or more mass % (99.8 or more mass % in a more preferable aspect of the invention). In the case where the current collector is a copper foil, a recovery rate of the recovered copper as a copper foil can be 99.95 or more mass %. As described above, the amount of the metal material constituents originating in the current collector that get mixed in with the active material stripped and recovered using the stripping agent according to the invention is very small, and therefore, the active material is recovered in a form that facilitates reutilization. As a result, the process of refinement in reutilizing the recovered active material may be simplified, and the cost of a treatment of regenerating the active material is reduced.

The stripping agent according to the invention, the treatment method according to the invention, and the treatment device according to the invention will be described hereinafter in detail citing a lithium-ion secondary battery as an example of a battery construction.

Example 1

Figure 2:
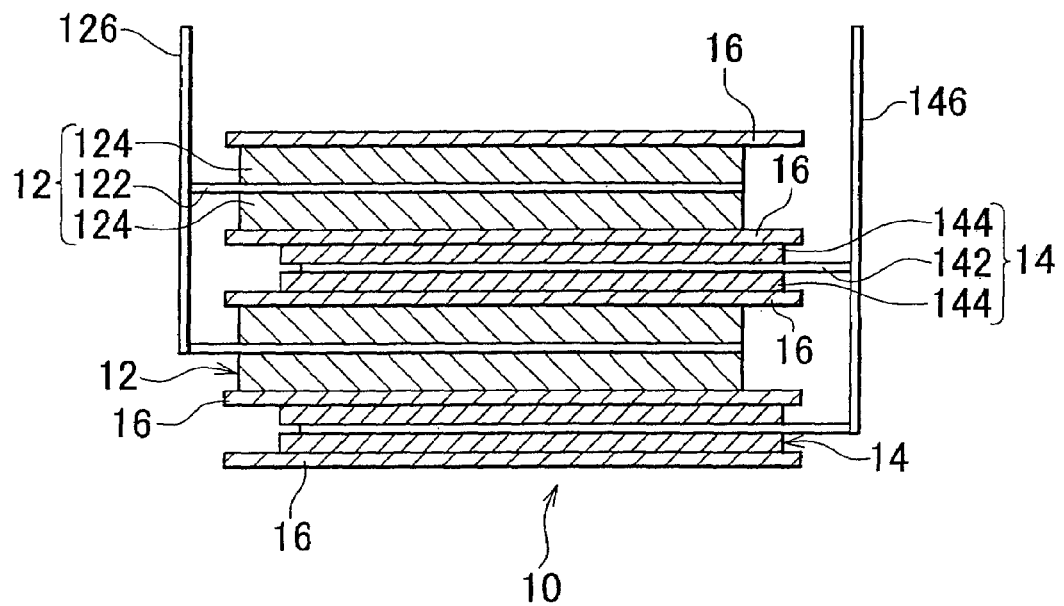
FIG. 2 is an illustrative view showing an electrode unit of the lithium-ion secondary battery according to one example of the invention on an enlarged scale.

First of all, the construction of a lithium secondary battery treated in this example (a used lithium-ion secondary battery for a vehicle in this case) will be described. FIG. 1 is a schematic sectional view showing the lithium-ion secondary battery according to this example. FIG. 2 is an illustrative view showing part of the lithium-ion secondary battery on an enlarged scale. As shown in these figures, a secondary battery 1 is equipped with a rolled-up electrode unit 10 obtained by flatly rolling up pairs of sheet-shaped electrodes (cathodes 12 and anodes 14) each via two corresponding ones of separator sheets 16, a flat rectangular parallelepiped (or square or plane) battery container 20 for accommodating the electrode unit 10, and a cathode terminal 30 and an anode terminal 40 that are connected to the electrode unit 10 at both axial ends thereof respectively. As shown in FIG. 2, each of the long sheet-shaped cathodes 12 (hereinafter referred to also as "the cathode sheets 12") constituting the electrode unit 10 is equipped with a long cathode current collector 122, and positive active material layers 124 provided by layering a cathode electrode material on both faces thereof respectively through adhesion. Each of the long sheet-shaped anodes 14 (hereinafter referred to also as "the anode sheets 14") is equipped with a long anode current collector 142, and anode active material layers 144 provided by layering an anode electrode material on both faces thereof respectively through adhesion. The electrode unit 10 has a construction in which these sheets are laminated in the order of the cathode sheet 12, the separator sheet 16, the anode sheet 14, and the separator sheet 16 and a laminated body thus obtained is rolled up in a lengthwise direction (longitudinal direction) thereof. Each of the laminated cathode sheets 12 and each of the laminated anode sheets 14 are isolated from each other by a corresponding one of the separator sheets 16.

The cathode current collector 122, a cathode current collector plate 126, and the cathode terminal 30, which constitute part of the secondary battery 1, are made of aluminum. The cathode current collector 122 is made of an aluminum foil with a thickness of about 5 to 20 μm. The anode current collector 142, an anode current collector plate 146, and the anode terminal 40 are made of copper. The anode current collector 142 is made of a copper foil with a thickness of about 5 to 20 μm. The separator sheets 16 are porous sheets made of a polyolefin (made of polypropylene in this case). The battery container 20 is made of aluminum, and is equipped with a main body (battery case) 22 in the shape of a bottomed tube, and a cover body (battery cover) 24 for sealing an upper end opening portion of the main body 22. The rolled-up electrode unit 10 is accommodated in this container 20. The cathode terminal 30 and the anode terminal 40 penetrate the cover body 24 and extend to the outside of the container 20. These terminals 30 and 40 are fixed to the cover body 24 by screws 32 and 42 respectively. The anode terminal 40 and the cover body 24 are separated from each other by insulating bodies 26. The cover body 24 has a liquid injection port 27 that injects an electrolytic solution or the like. The liquid injection port 27 is sealed during normal use of the secondary battery 1. The cover body 24 is provided with a safety valve 28. The safety valve 28 is designed to automatically bring the inside and outside of the container 20 into communication with each other to release an internal pressure of the container 20 when the pressure exceeds a predetermined set value.

The positive active material layer 124 of the secondary battery 1 is mainly constituted of a positive active material that is substantially made of a lithium-nickel containing composite oxide that contains nickel as a first transition metal element and cobalt as another metal element. The positive active material may be expressed by a general formula: Li $Ni_{1-x}Co_xO_2$ (0<x<0.5, preferably 0.1<x<0.3). Alternatively, $LiCoO_2$, $LiNiO_2$, or the like with a particle diameter of 5 μm to 30 μm can be used as another positive active material. In the secondary battery 1 according to this example, a lithium-nickel containing composite oxide with x in the general formula equal to about 0.2 (i.e., a composite oxide expressed as $LiNi_{0.8}Co_{0.2}O_2$) is used for the positive active material. The positive active material layer (cathode electrode material) 124 further contains conductive carbon black (CB) and polytetrafluoroethylene (PTFE) as a binding material. These materials are contained in such a proportion that the mass ratio of the positive active material:CB:PTFE is approximately 85:10:5. Each of the illustrated cathode sheets 12 is obtained by homogeneously kneading a mixture composed of the positive active material, CB, and PTFE into a paste, continuously coating the cathode current collector 122 (an aluminum foil with a thickness of about 15 μm) with the paste through the use of a die coater machine such that the thickness of a coating film on either face becomes about 50 μm, drying the paste, and securely pressure-bonding the paste as a finish through a mill roller machine such that the thickness of the electrode is about 100 μm.

On the other hand, the anode electrode material constituting the anode active material layer (graphite layer) 144 is mainly constituted of carbon black (CB) as an anode active material, and contains polytetrafluoroethylene (PTFE) as a binding material. These materials are contained in such a proportion that, for example, the mass ratio of CB:PTFE is approximately 90:10. Each of the illustrated anode sheets 14 is obtained by homogeneously kneading a mixture composed of the anode active material and PTFE into a paste, continuously coating the anode current collector 142 (a copper foil with a thickness of about 10 μm in this case) with the paste through the use of the die coater machine such that the thickness of a coating film on either face becomes about 40 μm, drying the paste, and securely pressure-bonding the paste through the mill roller machine such that a sheet with a thickness of about 80 μm is obtained. As described above, in each of the cathode sheets 12 and each of the anode sheets 14, the active material layers 124 and 144 are firmly and closely attached to the current collectors 122 and 142 respectively, to prevent the occurrence of swelling, stripping, or the like even at the time of exposure to an organic solvent for an electrolytic solution. Therefore, even when a physical and mechanical operation such as brushing or the like is performed, the active material layers (electrode materials) 124 and 144 cannot be stripped easily from the current collectors 122 and 142 respectively. For example, even when the cathode sheets 12 and the anode sheets 14 are immersed in a cleaning bath having an ultrasonic oscillator installed in water and vibrational energy is applied thereto for 10 minutes, 50% or more of the electrode material 124 and 50% or more of the electrode material 144 remain unstripped.

The electrode unit 10 is impregnated with an electrolytic solution (not shown). One, two, or more substances selected from ethylenecarbonate, propylenecarbonate, dimethylcarbonate (DMC), diethylcarbonate, ethylmethylcarbonate (EMC), 1,2-dimethoxyethane, 1,2-diethoxyethane, tetrahydrofuran, 1,3-dioxolan, and the like may be used as an organic solvent constituting the electrolytic solution. In the secondary battery 1 according to this example, a mixed solvent containing dimethylcarbonate and ethylmethylcarbonate in the ratio (mass ratio) of 7:3 is used. One or two or more substances selected from various lithium salts containing fluorine as a constituent element may be used as an electrolyte (supporting salt) constituting the electrolytic solution. For example, one or two or more substances selected from a group containing of $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, and the like may be used. In the secondary battery 1 according to this example, lithium hexafluorophosphate ($LiPF_6$) is used as the electrolyte at a concentration of about 1 mol/l.

Figure 3:
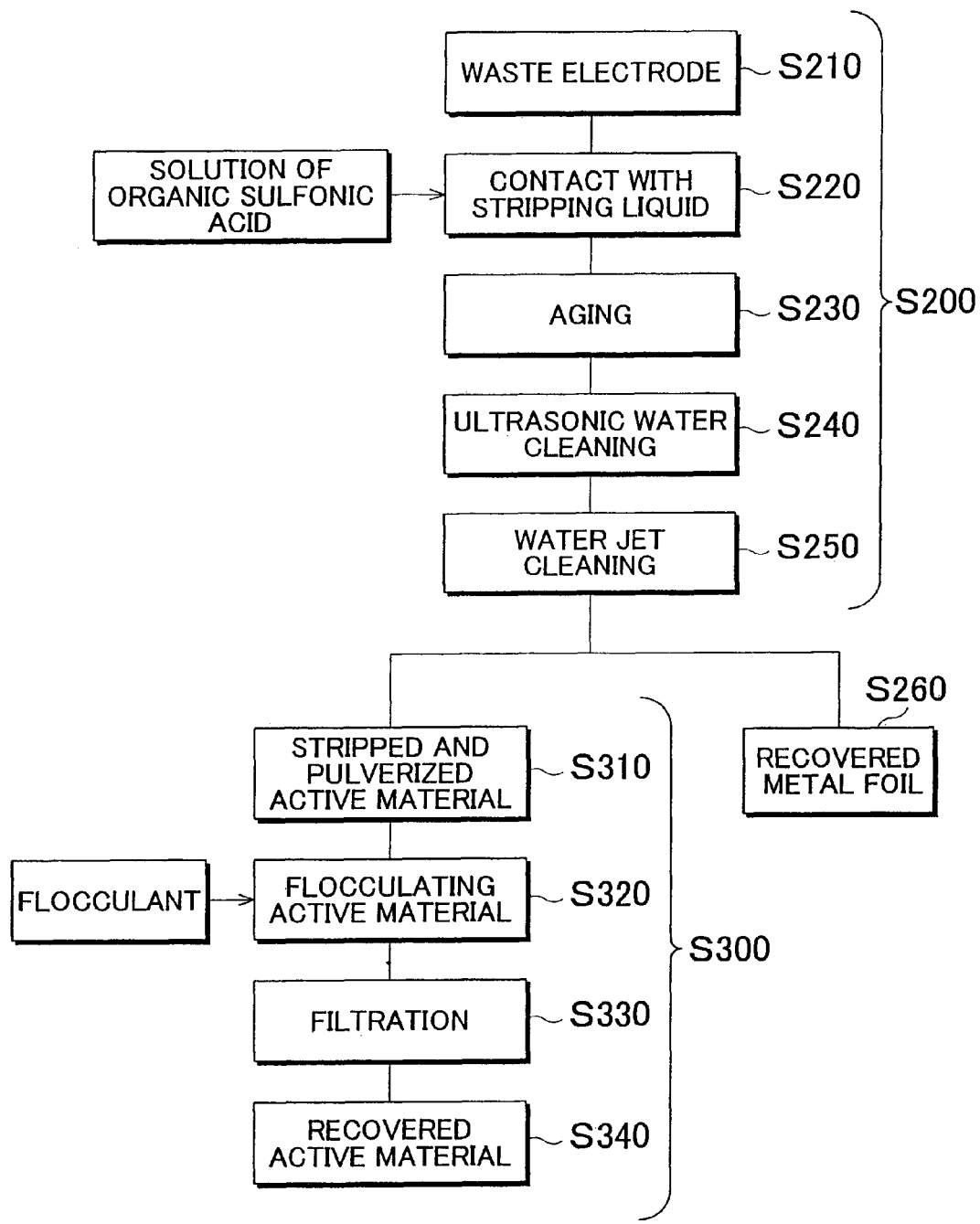
FIG. 3 is a flowchart showing the outline of a procedure of stripping and recovering an electrode material from the secondary battery according to one example of the invention.

Next, the treatment of the lithium-ion secondary battery 1 will be described with reference to FIG. 3. FIG. 3 is a flowchart showing the outline of the procedure. The method of treating the secondary battery according to this example includes stripping an electrode material adhering to a current collector (step S200), and recovering the stripped electrode material (step S300). These processes will be outlined as follows. That is, in the stripping process (step S200), the electrode is removed from the used lithium-ion secondary battery (step S210), a stripping agent mainly constituted of an organic sulfonic acid (i.e., a stripping liquid as an aqueous solution) is then supplied to and is exposed to the electrode (step S220), and an aging treatment of keeping the electrode and the stripping agent exposed to each other for a predetermined time is further performed (step S230). As a result of the aging treatment, the electrode material adhering to the surface of the current collector may be stripped or floated up from the surface of the current collector.

Afterwards, the electrode subjected to the aging treatment is immersed in a water bath equipped with an ultrasonic oscillator and subjected to ultrasonic water cleaning for a predetermined time (preferably 10 to 60 seconds, for example 30 seconds) (step S240). Then, the remaining electrode material is removed through water jet cleaning, namely, by injecting water on the surface of the current collector of the electrode (step S250). Due to these treatments, the surface of the current collector of the waste electrode may be stripped almost entirely of the electrode material that adheres to it. The current collector from which the electrode material has thus been removed is recovered into a suitable current collector recovery container (step S260). On the other hand, the electrode material removed from the current collector is dispersed in water typically in a pulverized state through ultrasonic water cleaning. Thus, the electrode material in this dispersed state is recovered in the subsequent recovery process (step S300).

In the recovery process (step S300), a dispersion liquid in which the electrode material containing a pulverized active material is dispersed is first recovered (step S310), a flocculent is added to the dispersion liquid so that the electrode material (active material) is flocculated in water and preferably turned into the state of a floc (step S320). Then, the flocculated floc-like electrode material (active material) is separated from the aqueous solvent (e.g., by filtration or the like) (step S330), and the electrode material (active material) present in the state of the floc is recovered (step S340).

The above method of treating the secondary battery will be described below in greater detail. Although not intended to be limited in particular, an example in which the cathode electrode material (active material) 124 is stripped and recovered from the cathode current collector 122 (aluminum foil) constituting each of the long sheet-shaped cathodes 12 of the lithium-ion secondary battery 1 will be described. First, the disassembly of a used lithium-ion secondary battery 1 and removal of the cathode sheets 12 in step S210 will be described. The lithium-ion secondary battery 1 may be disassembled, for example, as follows. The used lithium-ion secondary battery 1 is prepared and the battery container 20 is opened. It is appropriate that a method of opening the secondary battery 1 be suitably selected from a method of drilling a through-hole through the container 20, a method of releasing the seal of the liquid injection port 27, a method of actuating the safety valve 28, and the like. The lithium-ion secondary battery 1 is then heated under reduced pressure to remove the electrolyte and volatile constituents such as organic matters and the like within the battery container 20. More specifically, the opened secondary battery 1 is first subjected to a heat treatment (e.g., for 30 minutes at about 85° C.) under reduced pressure (e.g., about 50 kPa) to volatilize most of the DMC, which has a low boiling point. The temperature is then further increased (e.g., for 30 minutes at about 102° C.) to volatilize the remaining organic solvent (mainly EMC). The materials constituting the battery which remain after heating are then further heated (e.g., at about 160° C.) to thermally decompose the electrolyte ($LiPF_6$ in this case), and a gas containing thermally decomposed materials of the battery (decomposition gas) is removed. After that, with the heating temperature set to about 300° C., separators are thermally decomposed and hence removed from the remaining materials constituting the battery. Finally, with the heating temperature set to about 400° C., the binding material (PTFE in this example) contained in the electrode material is thermally decomposed and hence removed from the remaining materials constituting the battery. After the electrolyte and the volatile constituents such as the organic material and the like have thus been removed, the rolled-up electrode unit 10 is taken out. The sheet-shaped (typically long) cathode sheets 12 segregated from the anode sheets 14 by canceling (releasing) the rolled-up state of the rolled-up electrode unit 10 are taken out. The segregated cathode sheets 12 obtained from a plurality of electrode bodies 10 (i.e., a plurality of batteries) are coupled to one another in a longitudinal direction through welding or the like. For example, the positive active material that adheres to the ends of the respective cathode sheets 12 in the longitudinal direction thereof are removed, and those ends are joined to one another through welding or the like. Using the cathode sheets thus coupled (cathode sheet coupled body) as an electrode to be treated, a stripping treatment, which will be described below, is performed.

FIG. 4 schematically shows an example of the construction of a device used for the stripping treatment. Broadly speaking, a treatment device 300 shown in FIG. 4 is structured such that a cathode sheet sent out from a supply portion 310 is exposed to a stripping agent 322 in a stripping bath 320 (the stripping agent 322 is sprayed on the cathode sheet in FIG. 4), sequentially passes through an ultrasonic cleaning bath 330 and a water jet cleaning bath 340, and then is recovered into a current collector recovery container 70. The stripping process will be described in more detail. The cathode sheet coupled body 314 is wound around the supply portion 310 in the form of a roll. The positive active material layer (i.e., the cathode electrode material) 124 (mainly the positive active material and carbon black) adheres in a layered state to the surface of the aluminum foil 122 constituting the cathode sheet (coupled body 314). The cathode sheet (coupled body 314) continuously wound off from the supply portion 310 according to this example is guided to the stripping bath 320 while being held between two nets, namely, an inner conveyance net 311 and an outer conveyance net 312, which serve as electrode holding means according to this example.

Then, the stripping agent (stripping liquid) 322, which is mainly constituted of a suitable organic sulfonic acid compound, is supplied to and exposed to the cathode sheet coupled body 314 that has been guided to the stripping bath 320 (step S220). In this case, the stripping agent 322 is sprayed onto the cathode sheet coupled body 314. More specifically, the supply means according to this example is constructed as follows. That is, a spray nozzle 325 connecting to a stripping agent tank 323 accommodating the stripping agent 322 via a spray pump 324 is disposed in the stripping bath 320. A predetermined amount of the stripping agent 322 is sprayed from the spray nozzle 325 toward the cathode sheet coupled body 314. It is appropriate that the cathode sheet coupled body 314 and the stripping agent 322 be exposed to each other to such an extent that the cathode electrode material becomes wet with the stripping agent (1.0 to 2.0 g per 100 cm$^2$). The speeds of the conveyance nets 311 and 312, the quantitative spraying amount of the spray nozzle 325, and the like may be adjusted such that such an extent that the cathode electrode material becomes wet with the stripping agent of the stripping agent adheres. Excess stripping agent that does not adhere to the cathode sheet coupled body 314 is collected into a stripping agent recovery tank 60 from a stripping bath bottom port 326, and forwarded to the stripping agent tank 323 to be reutilized. It should be noted herein that an aqueous solution of benzenesulfonic acid is used as the stripping agent 322.

After the cathode sheet coupled body 314 has been sprayed with the stripping agent 322, it is moved into the stripping bath 320 for a predetermined time. During this time, the treatment of keeping the cathode sheet coupled body 314 and the stripping agent exposed to each other (aging treatment) is performed (step S230). In the aging process, the active material layer (cathode electrode material) 124 is stripped from the aluminum foil 122 that constitutes each of the cathode sheets 12 by the organic sulfonic acid in the stripping agent. That is, in the aging process, the organic sulfonic acid constituent in the stripping agent permeates the cathode electrode material 124, reaches the surface of the aluminum foil, and weakens the binding capacity of the cathode electrode material 124 that adheres to the surface of the aluminum foil 122, thereby making it possible to float up the cathode electrode material 124 from the surface of the aluminum foil 122.

After the cathode sheet coupled body 314 has been subjected to the aging treatment, physical vibrational energy is applied thereto (step S240). In this example, an ultrasonic oscillator 332 is provided as vibration means. That is, the cathode sheet coupled body 314 is immersed in the ultrasonic cleaning bath 330 having the ultrasonic oscillator 332 for a predetermined time (30 seconds in this case). Through the ultrasonic cleaning treatment, vibrational energy is applied to the cathode electrode material 124 whose binding capacity has weakened as a result of the exposure to the stripping agent, and therefore, the cathode electrode material 124 may be stripped reliably from the aluminum foil 122. The stripped cathode electrode material 124 is finely pulverized and dispersed in water.

After ultrasonic cleaning, the cathode sheet coupled body 314 further passes through the water jet cleaning bath 340 to be cleaned (step S250). In this case, water is injected on the surface of the aluminum foil of the cathode sheet coupled body 314 to wash off the cathode electrode material 124 remaining on the aluminum foil. At this stage of water jet cleaning, the cathode electrode material 124 has almost no binding capacity on the surface of the aluminum foil. Therefore, the cathode electrode material 124 can be washed off easily with high-pressure water (so-called jet shower water). Thus, that portion of the cathode electrode material 124 that has not been stripped during passage through the ultrasonic cleaning bath 330 can be removed from the aluminum foil 122.

After that, the cathode sheet coupled body 314 is recovered into the recovery container 70 as an aluminum material made substantially of the cathode current collector (the long aluminum foil 122) (step S260). The cathode current collector (aluminum foil) thus recovered can be reutilized as an aluminum material (stock) for various purposes. The stripping agent mainly hardly dissolves the cathode current collector made of aluminum. Therefore, the aluminum foil may be efficiently recovered (e.g., about 99.5 or more mass % of the aluminum material contained in the cathode current collector that has not been subjected to the stripping treatment yet). In this manner, the cathode current collector can be recovered from each of the cathode sheets as a high-quality aluminum material (long aluminum foil) having a metallic luster, with substantially no positive active material or the like adhering to the cathode current collector.

The conditions of the stripping treatment may be adjusted as necessary in accordance with various factors such as, for example, the treatment capacity required of the device, the material of the cathode current collector, the composition of the positive active material, etc. For example, the concentration of the stripping agent (the aqueous solution of benzenesulfonic acid in this case) may be set within a range of about 5 to 50 mass %. In general, it is preferable to set the concentration of the stripping agent within a range of about 10 to 30 mass % (e.g., about 10 mass %).

Although aging treatment may be carried out within a temperature range of about 0 to 60° C., it is preferable to carry out aging treatment at a room temperature (0 to 30° C., especially 10 to 30° C.). Furthermore, it is appropriate that an aging time be sufficient for the stripping agent to permeate into the cathode electrode material and reach the surface of the aluminum foil. More specifically, the aging time can be set within a range of 10 seconds to 80 seconds. More preferably, the aging time can be set to about 60 seconds. The aging time may be adjusted as needed in accordance with a treatment condition (e.g., the concentration of the stripping agent, the temperature for aging, etc.). For example, the aging time can be set to about 60 seconds under conditions where the aging temperature is room temperature and the concentration of the stripping agent is 10%. The aging time may also be reduced to about 40 seconds under conditions where the concentration of the stripping agent is about 20%.

In an aspect in which the respective portions of the long cathode sheet coupled body 314 sequentially proceed in the stripping bath 320 as shown in FIG. 4, the aging time may be adjusted by adjusting the speed at which the respective portions of the cathode sheet coupled body 314 proceed in the stripping bath 320 (i.e., the conveyance speed of the cathode sheet coupled body 314). In this example, the aging time may be set short as described above, and therefore, the conveyance speed of the cathode sheet coupled body 314 can be adjusted to a very high speed (e.g., 1 m/min). Thus, the respective portions of the long cathode sheet coupled body 314 are subjected continuously to the stripping treatment. As a result, the efficiency of treating the cathode sheets constituting the secondary battery (the lithium-ion secondary battery in this case) equipped with the rolled-up electrode is improved. The concentration of the stripping agent to be used, the spraying amount of the spray nozzle, and the like may be determined such that the stripping treatment is appropriately performed at the above conveyance speed. The treatment capacity may further be enhanced by disposing a plurality of devices or stripping baths in parallel with one another. It is appropriate that the amount of adhesion of the stripping agent to the cathode sheet coupled body 314 be set such that the cathode electrode material 124 of the cathode sheet coupled body 314 becomes wet with the stripping agent (more specifically, 1.0 to 2.0 g per 100 cm$^2$ of the cathode sheet). The conveyance speed of the cathode sheet coupled body 314, the quantitative spraying amount of the spray nozzle 325, may be adjusted as appropriate such that the amount of adhesion of the stripping agent is set as described above.

Next, the treatment of recovering the electrode material 124 stripped in the stripping bath 320, the ultrasonic cleaning bath 330, and the water jet cleaning bath 340 will be described. The stripped positive active material 124 accumulated in each of the baths is sucked up together with water at an appropriate timing using a pump 75, and collected into a flocculating bath 350. More specifically, the stripped cathode electrode material 124 is recovered from each of the stripping bath bottom port 326, an ultrasonic cleaning bath bottom port 333, and a water jet cleaning bath bottom port 342 into the flocculating bath 350 through a recovery pipe 74 (step S310). The stripped cathode electrode material 124 thus recovered is pulverized through ultrasonic cleaning or the like.

Subsequently, a treatment of supplying a flocculant using a pump 78 while stirring the inside of the flocculating bath 350 to flocculate the stripped and pulverized cathode electrode material 124 is performed (step S320). Due to the addition of this flocculant, the stripped and pulverized cathode electrode material 124 is deposited in the form of a large floc on a bottom of the flocculating bath 350, and a supernatant liquid (water) becomes transparent due to solid-liquid separation. For example, a nonionic polymeric flocculant or an anionic polymeric flocculant may be used as a preferred flocculant. Especially preferably, a solution of a copolymer of sodium acrylate and acrylamide can be used as a flocculant. By using the solution of the copolymer of sodium acrylate and acrylamide as the flocculant, high flocculation capacity can be realized with a small amount.

Next, the cathode electrode material 124 may be recovered by separating the floc-like stripped cathode electrode material 124 from the liquid phase by, for example, filtration, centrifugation, or the like (step S330). If the separation is carried out through filtration, for example, a pressurized tank-type filtering machine or a compression filter-type filtering machine, or the like can be used. In this example, the floc-like stripped cathode electrode material 124 is sent together with water to a pressurization-type filtering machine 81 using a pump 80, a cock 82 is closed to separate the floc-like cathode electrode material 124 on a filtering medium and water below the filtering medium from each other, and the floc-like cathode electrode material 124 is taken off from the filtering medium and recovered. Meanwhile, the water below the filtering medium is circulated to a water bath 65 and reutilized.

The cathode electrode material 124 thus recovered can then be separated, if necessary, into constituents constituting the cathode electrode material 124, and these constituents may be recovered individually. For example, the cathode electrode material 124 is dissolved using a strong acid (hydrochloric acid, nitric acid, sulfuric acid, or the like) to obtain an acid solution in which a lithium constituent and a transition metal constituent are dissolved in a mixed state, and the lithium constituent and the transition metal constituent are separated from each other using an appropriate separation method (e.g., ion exchange, electrolysis, separation through precipitation, or the like) and the like. After being refined, the lithium constituent and the transition metal constituent may each be recovered as a salt, an oxide, or a metal. A desired composite oxide (i.e., an active material) may be formed again from the recovered material.

As described above, according to this example, the cathode electrode material is partially or substantially entirely stripped spontaneously from the cathode current collector by treating the cathode sheet coupled body (which is obtained by coupling the cathode sheets to one another) having the cathode current collector to which the cathode electrode material containing the positive active material adheres with the stripping agent. The effect may be based on the fact that aluminum sulfate may be produced through a reaction between the organic sulfonic acid and the oxide film on the surface of the aluminum foil constituting the cathode current collector, but the technical scope of the invention is not intended to be limited to the operation and mechanism as described above. Even if the cathode electrode material remains partially or entirely on the cathode current collector after exposure to the stripping agent, the adhesive force of the cathode electrode material applied to the cathode current collector is weakened through the exposure to the organic sulfonic acid. Accordingly, the remaining cathode electrode material is removed easily from the cathode current collector by providing means for applying physical vibrational energy (e.g., ultrasonic cleaning) or means for washing off the cathode electrode material (e.g., water jet cleaning). In this manner, the positive active material and the cathode current collector (aluminum material) having substantially no positive active material adhering to the surface thereof may be separated/recovered efficiently from each of the cathode sheets having the positive active material on the cathode current collector thereof.

Further, according to this example, the organic sulfonic acid constituting the stripping agent has a very low capacity of dissolving the cathode current collector (aluminum). Therefore, the amount of the aluminum mixed in with the recovered positive active material is reduced. Accordingly, higher-purity constituents constituting the positive active material is recovered. The recovered material may be used desirably for the purpose of the manufacture of the positive active material (lithium/transition metal-containing composite oxide) for lithium-ion secondary batteries or the like. As described above, according to this example, various materials included in the lithium-ion secondary battery may be recovered in a form that ensures high usability. Also, those recovered material is reutilized effectively. Further, according to this example, the stripping agent containing the organic sulfonic acid compound completes the stripping treatment through short-time (e.g., about 60 seconds) exposure to the cathode sheet coupled body. Thus, the conveyance speed of the cathode sheet coupled body in the device for performing the stripping treatment may be set high (e.g., 1 m/min), and hence, the respective portions of the cathode sheet coupled body can be continuously subjected to the stripping treatment. As a result, a continuously operable device that treats a large number of lithium batteries can be provided.

In Example 1, the cathode electrode material is stripped and recovered from the cathode current collector (aluminum foil) constituting each of the cathode sheets of the lithium-ion secondary battery. However, a similar treatment method can be applied even if the anode electrode material is stripped and recovered from the anode current collector (copper foil) constituting each of the anode sheets of the lithium-ion secondary battery.

Although the stripping agent is sprayed onto the cathode sheets (the aforementioned coupled body 314 in this example) in Example 1, any suitable means for supplying the stripping agent may be used as long as the cathode electrode material of each of the cathode sheets becomes wet with the stripping agent. For example, each of the cathode sheets may be immersed in a large amount of the stripping agent, or the stripping agent can also be applied to both the faces of each of the cathode sheets through a dipping treatment or the like. However, when each of the cathode sheets is immersed in a large amount of the stripping agent to carry out stripping, the maintenance of a good stripping state may be impossible due to repeated use of the stripping agent. However, if the spraying method is adopted, the respective portions of each of the long cathode sheets are constantly exposed to fresh stripping agent, and therefore, a good and stable stripping state can be maintained. In addition, in the immersion method, each of the cathode sheets needs to be immersed in a large amount of the stripping agent (e.g., 10 to 20 times as large as the amount of the stripping agent in the case of the spraying method), and therefore, the amount of the stripping agent used per unit is enormous. Meanwhile, with the spraying method, the spraying of a small amount of the stripping agent is sufficient, and therefore, the amount of the stripping agent used per unit may be reduced. As a result, there is a merit in that the treatment of drainage of the stripping agent is facilitated. In Example 1, the cathode sheets obtained from the plurality of the electrode bodies and coupled to one another in advance in the longitudinal direction (the cathode sheet coupled body 314) are subjected to the stripping treatment, but the aspect of the stripping treatment is not limited thereto. For example, independent and individual rolled-up electrode bodies (including cathode sheets and anode sheets) may be set directly on a supply portion, the cathode sheets then segregated from the anode sheets while releasing the rolled-up states of the electrode bodies, and the cathode sheets then introduced into a stripping bath to perform a stripping treatment.

The electrode of a secondary battery that may be subjected to the stripping treatment is not limited to electrodes recovered through decomposition from a used battery whose normal cycle life has ended as described in Example 1 but may also be, for example, an electrode unfit for a product which can be produced from an electrode manufacturing process for both electrodes, namely, a cathode and an anode, an electrode recovered through decomposition from chips or an unnecessary battery (e.g., a battery that has become unnecessary in spite of an unused state thereof), or the like.

Although an aqueous solution of benzenesulfonic acid is used as the stripping agent in Example 1, any suitable organic sulfonic acid compound may be used as a stripping agent. FIG. 5 shows the names of representative substances usable as a stripping agent mainly constituted of an organic sulfonic acid, the chemical formulae thereof, the solubility of the substances in water, and the names of representative derivatives thereof. As shown in FIG. 5, a compound of either an aromatic sulfonic acid or an aliphatic sulfonic acid may be used as the organic sulfonic acid compound of the stripping agent. Further, water soluble organic sulfonic acids such as an ortho-, meta-, or para-isomers unmentioned in FIG. 5 that may be produced through arrangement of an $SO_3H$ group, naphtholsulfonic acid ($C_{10}H_{60}HSO_3H$) which is obtained by adding an OH group to naphthalenesulfonic acid, and the like can also be used. At least one of the organic sulfonic acid compounds, as which these substances are comprehensively referred to, is dissolved at 5 to 50 weight % (preferably with a concentration of 10 to 30 weight %) in an aqueous solvent (preferably water) for use as a stripping agent.

Example 2

In Example 2, in treating lithium-ion secondary batteries 1 having a construction similar to that of Example 1, the rate of the stripping of a cathode electrode material mainly from a cathode sheet was evaluated. The lithium-ion secondary batteries 1 having the construction shown in FIG. 1 were prepared. Safety valves 28 of these secondary batteries 1 were opened respectively, and subjected to a vacuum heating treatment, namely, heated for two hours at 200° C. and then for three hours at 500° C. under reduced pressure (50 kPa). Electrode bodies were removed from the batteries, and cathode sheets were segregated therefrom. Each of the segregated cathode sheets had a cathode current collector made of aluminum with heated residues of a cathode electrode material (mainly a positive active material and carbon black) adhering to the surface thereof in a layered manner. The electrode bodies were removed from the batteries, and the cathode sheets were segregated from the electrode batteries. In each of the segregated cathode sheets, the cathode current collector is made of aluminum with an electrode material adhering to the surface thereof in a layered manner. The cathode sheets are joined together in a longitudinal direction thereof to fabricate a cathode sheet coupled body. Using the cathode sheet coupled body as a material to be treated, a stripping treatment similar to that of Example 1 is performed with the aid of the device 300 having the construction shown in FIG. 4. An aqueous solution of benzenesulfonic acid with a concentration of about 10 mass % is used as the stripping agent 322. The conveyance speed of the cathode sheet coupled body 314 is set to 1 m/min. The quantitative amount of spraying from the spraying nozzle 325 is set to 15 g/min. According to this conveyance speed and this quantitative spraying amount, 1.5 g of the stripping agent adheres per 100 $cm^2$ of the cathode sheet coupled body (the actual effective rate of adhesion is about 80%). The aging temperature in the stripping bath 320 (i.e., the temperature in the stripping bath 320) is set to room temperature, and the aging time (i.e., the time for which the cathode sheet coupled body 314 sprayed with the stripping agent stays in the stripping bath 320) is set to about 60 seconds. The time for ultrasonic cleaning is set to about 30 seconds.

The cathode sheet coupled body 314 which was sent out from the supply portion 310 exposed to the stripping agent 322 and then moved to the stripping bath, the cathode electrode material gradually floated up from the surface of the cathode current collector, and part of the cathode electrode material was deposited on the bottom of the stripping bath 320. In subsequent ultrasonic cleaning, most of the cathode electrode material was dispersed in the form of fine powder from the surface of the cathode current collector. The stripping rate of the cathode electrode material at this stage was about 93%. Moreover, in water jet cleaning, about 5% of the cathode electrode material that remains on the cathode current collector is removed by the water used to clean the cathode current collector. The cathode current collector (aluminum foil) thus recovered into the recovery container 70 had a metallic luster, and the adhesion of the cathode electrode material on the surface of the cathode current collector was hardly observed. The stripping rate of the cathode electrode material at this stage was 98% or more.

Example 3

In Example 3, a stripping treatment was performed under the same conditions as in Example 2 except that the aging time, and the influence of the aging time on the effect of stripping was evaluated. As a result, when the aging time was 10 seconds, the rate of stripping did not exceed 55%, and about half of the cathode electrode material remained. The rate of stripping (%) increased as the aging time was increased (20 seconds→76%, 30 seconds→89%). It was confirmed that the rate of stripping was almost 100% in the case when the aging time is longer than 40 seconds (40 seconds→98%, 50 seconds→98%, 60 seconds→99%, 70 seconds→99%, 80 seconds→99%). These results also showed that an electrode material adhering to the surface of a current collector may be stripped on a practical level while setting a short aging time if the aging time was equal to or longer than about 40 seconds. It was recognized that the setting of the aging (exposure) time to about 60 seconds was sufficient even in consideration of variations in operability or the like in the case of using, although not in a limitative sense, a stripping agent according to this example.

Example 4

In Example 4, a stripping treatment was performed under the same conditions as in Example 2 except that aqueous solutions of organic sulfonic acids each constituting a stripping agent is different from that of Example 2, and the recovery rates of a cathode current collector (aluminum foil) and an anode current collector (copper foil) were evaluated. More specifically, aliphatic sulfonic acids, for example, such as methanesulfonic acid, ethanesulfonic acid, methanedisulfonic acid, and ethylmethylsulfonic acid, and aromatic sulfonic acids, such as, for example, benzenesulfonic acid, toluenesulfonic acid, xylenesulfonic acid, and naphthalenesulfonic acid, were used as the organic sulfonic acids, and stripping agents (solvent: water) at a concentration of 10 mass % were prepared respectively. Thus, a similar stripping treatment was performed under conditions similar to that of Example 2 (i.e., with the aging time set to 60 seconds). Then, when cathode current collectors (aluminum foils) and anode current collectors (copper foils) that were recovered into the recovery container 70 were observed, it was apparent that all of the current collectors had a metallic luster. Subsequently, the reduction weight rates of the recovered cathode current collectors (aluminum foils) and the recovered anode current collectors (copper foils) were measured. FIG. 6 shows a result of this measurement.

When the aluminum foil reduction weight rates for a theoretic weight (Al=0.405 g) per 100 $cm^2$ of the cathode current collectors (aluminum foils) recovered into the recovery container 70 were calculated, it was apparent that the reduction weight rate was equal to or lower than 0.5% regardless of which aqueous solution of the organic sulfonic acids was used. It has been confirmed through this example that an aqueous solution of an organic sulfonic acid hardly dissolves a cathode current collector (aluminum foil) and restrains aluminum constituents from becoming mixed in with the stripped and recovered electrode material. In particular, if any of the aqueous solutions of the aromatic sulfonic acids was used as the stripping agent, the aluminum foil reduction weight rate was equal to or below 0.12%. That is, the aluminum constituents could further be restrained from getting mixed in with the electrode material. It has also been confirmed that the aluminum foil reduction weight rate increases as the number of sulfo groups substituting for a carbon skeleton increases. More specifically, the aluminum foil reduction weight rate was 0.35% in the case of methanesulfonic acid, which has one substituent, and 0.48% in the case of methanedisulfonic acid, which has two substituents. On the other hand, when the copper foil reduction weight rates for a theoretic weight (Cu=0.889 g) per 100 $cm^2$ of the anode current collectors (copper foils) recovered into the recovery container 70 were calculated, it was apparent that the reduction weight rate was equal to or lower than 0.05% regardless of which aqueous solution of the organic sulfonic acids was used. It has been confirmed through this example that an aqueous solution of an organic sulfonic acid does not substantially dissolve an anode current collector (copper foil) at all and can significantly restrain copper constituents from getting mixed in with a stripped and recovered electrode material.

The invention claimed is:

1. A method of treating a secondary battery equipped with an electrode composed of a current collector and an electrode material adhering thereto, the method comprising:
   exposing the electrode being shaped as a long sheet to a stripping agent made of a solution including aqueous solvent of at least one of an organic sulfonic acid and an organic sulfonic acid derivative to strip the electrode material from the current collector, and
   moving the electrode held by an electrode holding device as a supply device continuously supplies the stripping agent to the held electrode, wherein:
   the secondary battery is a lithium secondary battery including a positive active material constituted of a metal complex oxide whose constituent elements are lithium and one, two or more transition metal elements,
   the current collector comprises metal foil, the electrode material comprises an active material layer, and
   the active material layer is stripped from a boundary face between the current collector and the active material layer by the stripping agent.

2. A method according to claim 1, wherein
at least one of the organic sulfonic acid and the organic sulfonic acid derivative in the solution including aqueous solvent has a concentration of 5 to 90 mass %.

3. A method according to claim 1, wherein
the organic sulfonic acid is an aromatic sulfonic acid.

4. A method according to claim 3, wherein
the aromatic sulfonic acid is at least one substance selected from a group consisting of benzenesulfonic acid, toluenesulfonic acid, xylenesulfonic acid, and naphthalenesulfonic acid.

5. The method according to claim 1, further comprising
vibrating the electrode that is exposed to the stripping agent.

6. The method according to claim 1, further comprising
recovering an active material or constituents of an active material from the stripped electrode material.

7. The method according to claim 6, further comprising
supplying a flocculant to a recovered liquid containing the electrode material stripped from the current collector to flocculate the electrode material.

8. A method of treating a secondary battery equipped with an electrode composed of a current collector and an electrode material adhering thereto, the method comprising:
exposing the electrode to a stripping agent made of a solution including aqueous solvent of at least one of an organic sulfonic acid and an organic sulfonic acid derivative to strip the electrode material from the current collector, wherein:
the secondary battery is a lithium secondary battery including a positive active material constituted of a metal complex oxide whose constituent elements are lithium and one, two or more transition metal elements,
the stripping agent is sprayed on the electrode to expose the electrode and the stripping agent to each other,
the current collector comprises metal foil, the electrode material comprises an active material layer, and
the active material layer is stripped from a boundary face between the current collector and the active material layer by the stripping agent.

9. The method according to claim 8, further comprising
vibrating the electrode that is exposed to the stripping agent.

10. The method according to claim 8, further comprising
recovering an active material or constituents of an active material from the stripped electrode material.

11. The method according to claim 10, further comprising
supplying a flocculant to a recovered liquid containing the electrode material stripped from the current collector to flocculate the electrode material.

\* \* \* \* \*